Oct. 8, 1968 D. R. TANGUY 3,405,350
APPARATUS FOR COMBINING WELL LOGGING MEASUREMENTS DERIVED
FROM A PLURALITY OF BOREHOLE WALL-ENGAGING PAD MEMBERS
Filed Nov. 22, 1966 2 Sheets-Sheet 1
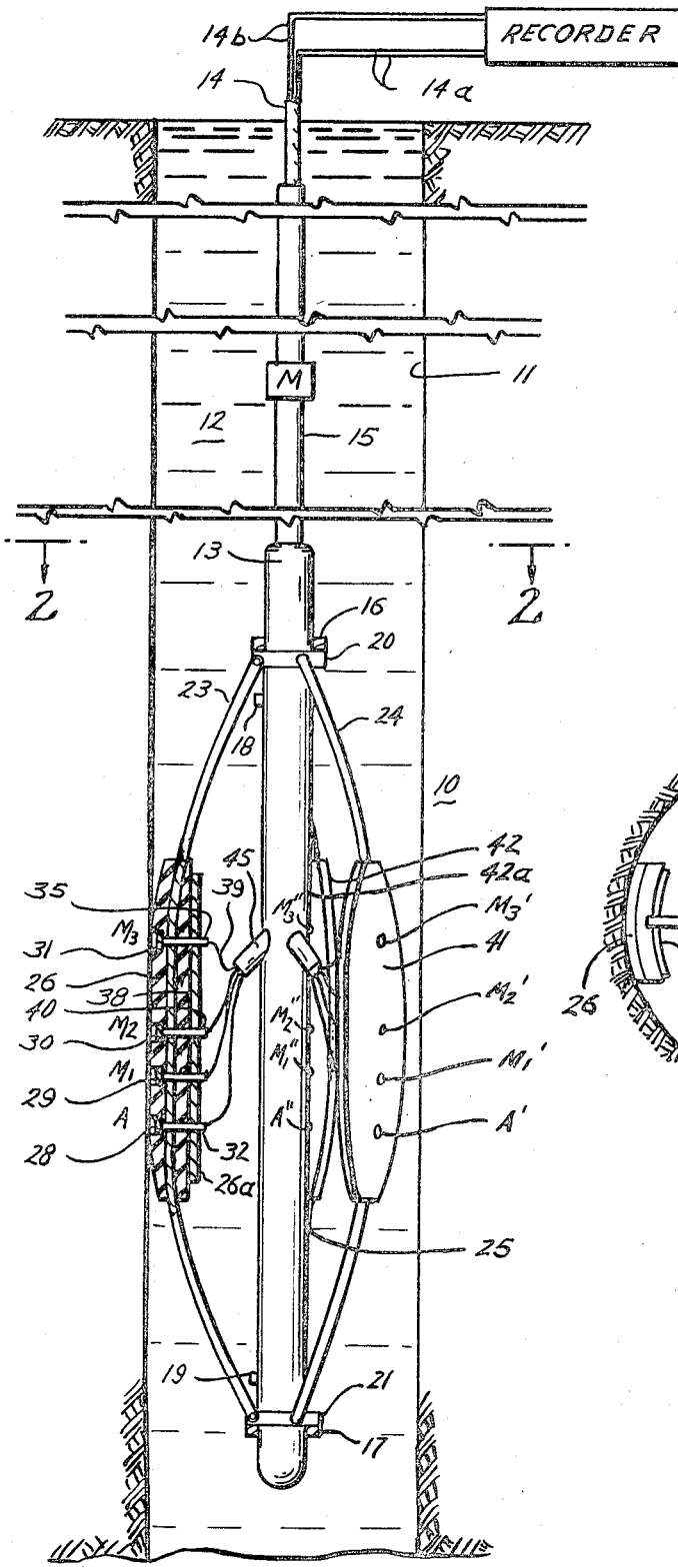
Denis R. Tanguy
INVENTOR.
BY Edward M. Roney
ATTORNEY

United States Patent Office 3,405,350
Patented Oct. 8, 1968

3,405,350
APPARATUS FOR COMBINING WELL LOGGING MEASUREMENTS DERIVED FROM A PLURALITY OF BOREHOLE WALL-ENGAGING PAD MEMBERS
Denis R. Tanguy, Houston, Tex., assignor to Schlumberger Technology Corporation, Houston, Tex., a corporation of Texas
Filed Nov. 22, 1966, Ser. No. 596,182
7 Claims. (Cl. 324—10)

ABSTRACT OF THE DISCLOSURE

In accordance with an illustrative embodiment of the invention, apparatus for combining well logging measurements derived from a plurality of borehole wall-engaging pad members is disclosed. More specifically, the measurements derived from given electrodes on each pad member are averaged by a plurality of averaging circuits comprising relatively high value resistors connected between different ones of the electrodes and a low resistance summing resistor. The potential difference between different ones of the averaged measurements are obtained through the use of high input impedance amplifying means connected to different ones of the summing resistors.

---

Figure 3:
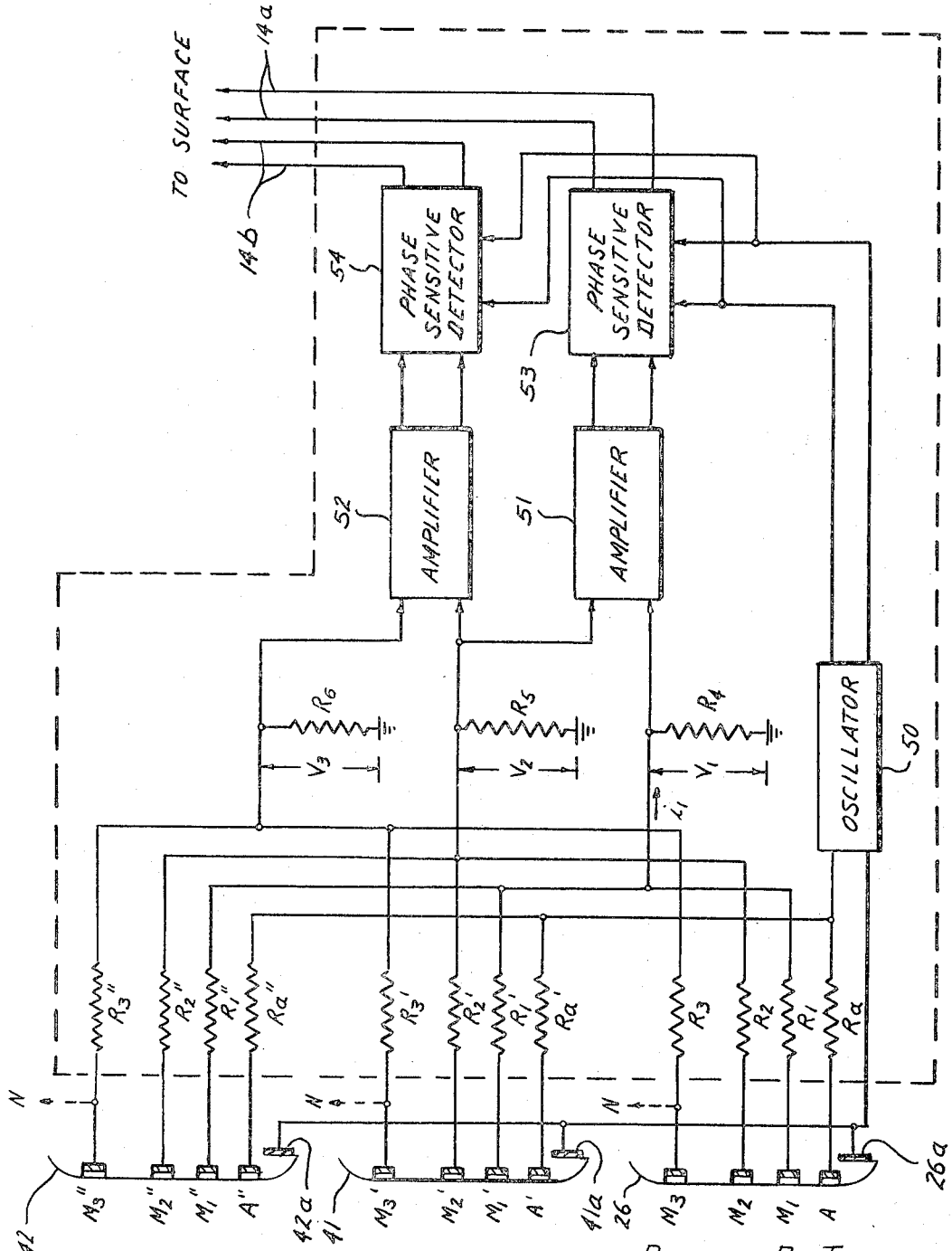

This invention relates to methods and apparatus for investigating subsurface earth formations traversed by a borehole. More specifically, it has to do with well logging methods and apparatus of the type wherein electrodes are mounted on pad members adapted to engage the borehole wall for providing indications of the electrical resistivity or conductivity of the surrounding earth formations.

When investigating earth formations surrounding a borehole with a pad mounted electrode system, it is not uncommon for all or part of the wall-engaging face of the pad member to be separated from the wall of the borehole due to such things as odd shaped boreholes, or rugose walls of the borehole. In this event, the resistivity or conductivity readings derived from the pad mounted electrode system will be in error since the resistivity of the mud would now be a factor in the obtained resistivity or conductivity reading. Since the resistivity of the mud is generally less than that of the earth formations surrounding the borehole, much of the current emitted from the electrodes on the pad member will short to the current return electrode, thus rendering the well logging measurements inaccurate.

One form of a pad mounted electrode system is the so-called "microlog" system wherein current is emitted from one current-emitting electrode and the difference in potential between other measure electrodes is measured. The electrodes may all be located on the pad member or, alternatively, one or more electrodes may be located at a remote point from the pad member. In any case, the difference in potential between different ones of the measure electrodes provide information as to the presence or absence of mudcake on the borehole wall. When all or part of the pad member becomes separated from the borehole wall, the information derived from this device may well be in error.

One way to correct for this possible error as shown in copending application Ser. No. 596,204, filed by N. A. Schuster on Nov. 22, 1966, is to provide more than one pad member and average the readings since the chances of more than one pad member becoming removed from the borehole wall is not so great. However, in the case of averaging the readings of a plurality of "microlog" devices, problems arise. The averaging network must be designed so as to keep from loading down the impedance presented by the earth formations and still provide an averaged signal of sufficient magnitude to be sensed by the detecting circuitry. Since, in a "microlog" device, one electrode on each pad member is common to two potential difference measuring circuits, there is a problem of feedback between the two potential difference measuring circuits which must be accounted for.

It is an object of the invention, therefore, to provide new and improved well logging methods and apparatus for investigating subsurface earth formations surrounding a borehole wherein wall-engaging pad members are utilized.

In accordance with one feature of the invention, apparatus for investigating earth formations traversed by a borehole comprises a central support member adapted for movement through the borehole and a plurality of pad members supported by the central support member and adapted to engage the borehole wall. The apparatus further comprises a plurality of electrodes, at least some of which are located on the plurality of pad members and means for supplying current to at least one of the electrodes for emission into the surrounding earth formations. The apparatus further comprises measuring means coupled to at least one electrode on each pad member for providing a measurement signal representative of a characteristic of the surrounding earth formations, said measuring means including a plurality of series impedance means each connected in series circuit relationship with one of the electrodes of each pad member, the impedance of each of said series impedance means being relatively large compared to the impedance of the earth formations. The apparatus further comprises second impedance means coupled between the nonelectrical side of the plurality of series impedance means and a common reference point, the parallel impedance means having substantially less impedance than each of the series impedance means, and means coupled to the second impedance means for providing a signal representative of the characteristic.

In accordance with another feature of the invention, apparatus for investigating earth formations traversed by a borehole comprises a plurality of exploring means adapted for movement through a borehole, each exploring means providing a plurality of measurement signals representative of given characteristics of the formations. The apparatus further comprises a plurality of averaging means, each responsive to at least one measurement signal from each exploring means for providing an averaged measurement signal and means for combining the averaged measurement signals from at least two of the averaging means for providing an output signal representative of a given formation characteristic.

For a better understanding of the present invention, together with other and further objects thereof, reference is had to the following description taken in connection with the accompanying drawings, the scope of the invention being pointed out in the appended claims.

Referring to the drawings:
FIGURE 1 illustrates the mechanical features of the well logging apparatus of the present invention, including a representative embodiment of the configuration of the pad mounted electrodes;
FIGURE 2 shows a cross-sectional view of the apparatus of FIGURE 1 located in an odd shaped borehole; and
FIGURE 3 illustrates the electrode configuration utilized with the present invention along with a schematic representation of the electrical circuitry to be utilized therewith.

Referring to FIGURE 1 of the drawings, there is shown a representative embodiment of the mechanical apparatus constructed in accordance with the present invention along with one embodiment of the electrodes, for investigating subsurface earth formations 10 traversed by a borehole 11. The borehole 11 is filled with the conductive drilling fluid or drilling mud 12. The borehole investigating apparatus includes an elongated central support member 13, the interior portion of which has a fluid-tight housing containing the downhole electrical circuitry. The central support member 13 is suspended from the surface of the earth by means of an armored multiconductor cable 14, the lower 100 feet or so of which is covered with an electrical insulation material 15. At the surface of the earth, the cable 14 is reeled in and out of the borehole by a drum and winch mechanism (not shown).

Secured to the central support member 13 are an upper collar 16 and a lower collar 17, both rigidly secured to the support member 13. Located somewhat below the upper collar 16 is an upper stop means 18 rigidly secured to the support member 13. Located just above the lower collar 17 is a lower stop means 19, likewise secured to the central support member 13. Located intermediate of the upper fixed collar 16 and upper stop means 18 is a slidable collar 20. Located between the lower fixed collar 17 and the lower stop means 19 is a lower slidable collar 21. A plurality of bowed springs 23, 24 and 25 are each pivotally mounted to upper and lower slidable collars 20 and 21 and are located at equally spaced-apart locations around the circumference of central support member 13. In this case, the three bowed springs 23, 24 and 25 are spaced 120° apart around the circumference of central support member 13.

Bowed spring 23 passes through the interior portion of pad member 26 (shown in cross section) securing pad member 26 to bowed spring 23. The pad member 26 has a metal plate 26a secured to the back side thereof. Formed in the pad member 26 are a plurality of recesses 28, 29, 30 and 31 within which are embedded a plurality of electrodes A, $M_1$, $M_2$ and $M_3$. The survey current-emitting electrode A is located near the bottom of pad member 26. Located just above the survey current electrode A is a first monitor electrode $M_1$. Located just above the first monitor electrode $M_1$ is a second monitor electrode $M_2$, and a third monitor electrode $M_3$ is located above the second monitor electrode $M_2$. A plurality of hollow tubes 32, 33, 34 and 35 made of nonconductive material pass from the electrodes A, $M_1$, $M_2$ and $M_3$ respectively through an opening in the bowed spring 23 and the metal back plate 26a to provide a passage for the conductors which connect the electrodes to the electrical circuitry within central support member 13. A plurality of conductors 36, 37, 38, 39 and 40 connect electrodes A, $M_1$, $M_2$, $M_3$, and the pad back plate 26a respectively to the electrical circuitry contained within support member 13 through a conduit 45.

In like fashion, a wall-engaging pad member 41 is fixed to bowed spring 24 and a wall-engaging pad member 42 is fixed to bowed spring 25. Pad member 41 has a plurality of electrodes A′, $M_1'$, $M_2'$ and $M_3'$, located thereon in the same manner as pad member 26. Likewise, pad member 42 has a plurality of electrodes A″, $M_1''$, $M_2''$ and $M_3''$. Pad member 41 has a pad back plate 41a (not shown) in the same manner as pad back plate 26a and pad member 42 has a pad back plate 42a. A plurality of conductors connect the electrodes on pad members 41 and 42 to the electrical circuitry within support member 13 in the same manner as pad member 26.

An electrode N is shown located above the central support member 13 on the insulated portion 15 of cable 14. Electrical connection to the electrode N is made by a conductor (not shown) which passes through the cable 14. The signals indicative of the information obtained by the well logging apparatus are transmitted from the electrical circuitry within downhole support member 13 through armored multiconductor cable 14 via conductor pairs 14a and 14b to a recorder 44 at the surface of the earth.

The bowed springs 23, 24 and 25 pivotally mounted on slidable collars 20 and 21 are adapted to urge the pad members 26, 41 and 42 toward the wall of the borehole, and yet allow the well logging apparatus to pass through relatively narrow portions of the borehole. This is accomplished since the slidable collars 20 and 21 are adapted to slide between fixed collars 16 and 17 and stop means 18 and 19, with the spring action of bowed springs 23, 24 and 25 maintaining the pad members 26, 41 and 42 pressed outwardly. The particular apparatus shown in FIGURE 1 for maintaining the pad members in a wall-engaging position is only exemplary, and other types of well logging apparatus for maintaining electrodes in a wall-engaging position could be utilized.

Looking now at FIGURE 2, there is shown a cross section view taken along the section line 2—2 of FIGURE 1. The borehole 11 is shown to be odd shaped, that is, other than a circular shape. One of the pad members 41 is shown to not be in contact with the wall of the borehole due to this odd shape of the borehole. When one of the pad members is removed from the wall of the borehole, such as pad member 41 in FIGURE 2, the readings obtained from the electrodes mounted on that particular pad member will be in error. If pad member 41 were the only pad member for investigating subsurface earth formations, then there would be no accurate measurements of the subsurface earth formations during the time when pad member 41 is in the position shown in FIGURE 2.

Looking now at FIGURE 3, there is shown apparatus for providing substantially accurate measurements of subsurface earth formations under such adverse borehole conditions as shown in FIGURE 2. The FIGURE 3 apparatus includes the pad members 26, 41 and 42 with the same electrodes as shown in FIGURE 1 and having the same designations. The survey current electrodes A, A′ and A″ are connected through resistors $R_A$, $R_A'$ and $R_A''$ respectively to one of the output terminals of an oscillator 50. Resistors $R_A$, $R_A'$ and $R_A''$ have equal resistance values. The other output from oscillator 50 is supplied to the pad back plates 26a, 41a and 42a of pad members 26, 41 and 42. Monitor electrodes $M_1$, $M_1'$ and $M_1''$ are connected through resistors $R_1$, $R_1'$ and $R_1''$ respectively, to one side of a resistor $R_4$ and one side of the input to an amplifier 51. The other side of resistor $R_4$ is connected to chassis ground. The ground designation corresponds to a common point for the electrical circuitry located within the fluid-tight housing of central support member 13 and could be, for example, the amplifier housing.

The monitor electrodes $M_2$, $M_2'$ and $M_2''$ are connected through resistors $R_2$, $R_2'$ and $R_2''$ respectively to one side of a resistor $R_5$, one point input of an amplifier 52, and to the other input to amplifier 51. Amplifiers 51 and 52 both have a high input impedance. The other side of resistor $R_5$ is connected to chassis ground. Monitor electrodes $M_3$, $M_3'$ and $M_3''$ are connected through resistors $R_3$, $R_3'$ and $R_3''$ respectively, to one side of a resistor $R_6$ and to the other input to amplifier 52. The other side of resistor $R_6$ is connected to chassis ground. The output of amplifier 51 is connected to the input of a phase-sensitive detector 53, the output from phase-sensitive detector 53 being supplied to the surface of the earth via conductor pair 14a. The output from amplifier 52 is supplied to the input to a phase-sensitive detector 54, the output of which is supplied to the surface of the earth via conductor pair 14b. Oscillator 50 supplies the phase-reference signal to phase-sensitive detectors 53 and 54. Resistors $R_1$, $R_1'$, $R_1''$, $R_2$, $R_2'$, $R_2''$, $R_3$, $R_3'$ and $R_3''$ desirably have equal resistance values.

Now concerning the operation of the FIGURE 3 apparatus, oscillator 50 supplies a substantially constant voltage output signal. Resistors $R_A$, $R_A'$ and $R_A''$ are relatively large in magnitude so that a relatively constant current will be supplied to the survey current electrodes regardless of the resistivity between the various survey current electrodes and their respective pad back plates through the earth formations. By this means, if one of the pad members should be separated from the wall of the borehole, as pad 41 in FIGURE 2, thus causing a substantial portion of the current emitted from the survey current electrode of that pad member to short directly to the pad back plate, the survey current being emitted by the remaining survey current electrodes of the other two pad members will remain substantially constant.

Concerning the monitor electrode circuitry, the voltage sensed by each monitor electrode of a given set of monitor electrodes, that is, $M_1$, $M_1'$, $M_1''$ or $M_2$, $M_2'$, $M_2''$ or $M_3$, $M_3'$, $M_3''$, are applied to a resistor network which determines the average voltage of the three corresponding monitor electrodes. To accomplish this averaging, the resistors $R_1$, $R_2$ and $R_3$ etc., have a substantially greater value of resistance than do the resistors $R_4$, $R_5$ and $R_6$. Resistors $R_1$, $R_2$ and $R_3$ etc. desirably each have a resistance several times greater than the resistance presented by the earth formations to each electrode. Thus, the voltage $V_1$ developed across resistor $R_4$ is the average of the voltages sensed by monitor electrodes $M_1$, $M_1'$, and $M_1''$; the voltage $V_2$ across resistor $R_5$ is the average of the voltages sensed by monitor electrodes $M_2$, $M_2'$ and $M_2''$; and the voltage $V_3$ across resistor $R_6$ is the average of the voltages sensed by monitor electrodes $M_3$, $M_3'$ and $M_3''$. Amplifier 51 senses the difference in potential between $V_1$ and $V_2$, and after amplification, supplies a signal proportional to $V_1-V_2$ to phase-sensitive detector 53. The output signal from phase-sensitive detector 53 is a DC signal proportional to that portion of $V_1-V_2$ which is in-phase with the phase-reference signal from oscillator 50. In the same manner, the output signal from phase-sensitive detector 54 is proportional to that portion of the difference in potential between $V_2$ and $V_3$ which is in-phase with the output signal from oscillator 50. It can be seen that since amplifiers 51 and 52 have high input impedance, there is no feedback between the circuits measuring the potential differences $V_1-V_2$ and $V_2-V_3$.

Thus, the signal on conductor 14a will be proportional to the difference in potential between the average of the voltages on monitor electrodes $M_1$, $M_1'$ and $M_1''$ and the average of the voltages on monitor electrodes $M_2$, $M_2'$ and $M_2''$. Likewise, the signal on conductor 14b will be proportional to the difference in potential between the average of the voltages on monitor electrodes $M_2$, $M_2'$ and $M_2''$ and the average of the voltages on $M_3$, $M_3'$ and $M_3''$ and this is accomplished without feedback between the measuring circuits. If now one of the pad members should become removed from the wall of the borehole, the error which will be present in the voltage derived across the resistors $R_4$, $R_5$, or $R_6$ will be ⅓ as large as the error which would be present if only one pad member were utilized.

Alternately, the remote electrode N, shown in FIGURE 1, could be substituted for monitor electrodes $M_3$, $M_3'$ and $M_3''$. This is represented by the dotted line pointing to N in FIGURE 3. If the remote electrode N were used, one resistor connected to resistor $R_3$ would suffice instead of the three resistors $R_3$, $R_3'$ and $R_3''$.

In co-pending application Ser. No. 566,019 by F. M. Eaton filed on July 18, 1966, it has been shown that, with the electrode configuration of the FIGURES 1 and 3 apparatus, it is desirable to take the ratio (considering one pad member) of the difference in potential between the monitor pair $M_1-M_2$ and the monitor pair $M_2-M_3$. This ratio signal provides an indication of the presence or absence of a mudcake on the wall of the borehole, which is indicative of permeable or impervious earth formations surrounding the borehole. In the FIGURE 3 embodiment, this would correspond to taking the ratio of the signals on conductor pairs 14a and 14b. By taking the ratio of these two output signals, if one of the pad members becomes separated from the wall of the borehole, as shown in FIGURE 2, then there will be very little, if any, error in the ratio of these two output signals.

This can better be understood by looking at the mathematical relationships for the signals derived by the apparatus of FIGURE 3. The total current $i_1$ from monitor electrodes $M_1$, $M_1'$, and $M_1''$ flows primarily through resistor $R_4$ since the input impedance to amplifier 51 is very high in comparison to the resistance of resistor $R_4$. Since the resistance of $R_4$ is much less than the resistance of $R_1$, $R_1'$ and $R_1''$, $R_4$ can be neglected in determining the value of $i_1$. Thus, the relationship for $i_1$ can be written as:

$$i_1 = \frac{V_{M_1}}{R_1} + \frac{V_{M_1'}}{R_1'} + \frac{V_{M_1''}}{R_1''} \tag{1}$$

where $V_{M_1}$ is the voltage on monitor electrode $M_1$, $V_{M_1'}$ is the voltage on monitor electrode $M_1'$, and $V_{M_1''}$ is the voltage on monitor electrode $M_1''$.

The voltage $V_1$ developed across resistor $R_4$ is equal to:

$$V_1 = \frac{V_{M_1}}{R_1}R_4 + \frac{V_{M_1'}}{R_1'}R_4 + \frac{V_{M_1''}}{R_1''}R_4 \tag{2}$$

Since $R_1 = R_1' = R_1''$, Equation 2 can be rewritten as:

$$V_1 = \frac{R_4}{R_1}(V_{M_1} + V_{M_1'} + V_{M_1''}) \tag{3}$$

Equation 3 is the relationship for $V_1$ whatever may be the position of the pad members. If the pad members are all flush against the wall of the borehole, then $$V_{M_1} = V_{M_1'} = V_{M_1''}$$

(except in certain instances where the earth formations are not concentrically homogeneous with respect to the borehole). Thus, Equation 3 can be rewritten as:

$$V_1 = \frac{3R_4 V_{M_1}}{R_1} \tag{4}$$

By the same procedure, the voltage $V_2$ developed across resistor $R_5$ will be equal to:

$$V_2 = \frac{R_5}{R_2}(V_{M_2} + V_{M_2'} + V_{M_2''}) \tag{5}$$

where $V_{M_2}$ is the voltage on monitor electrode $M_2$, $V_{M_2'}$ is the voltage on monitor electrode $M_2'$ and $V_{M_2''}$ is the voltage on monitor electrode $M_2''$. Thus, in the case where all of the pad members are flush, Equation 5 can be rewritten as:

$$V_2 = \frac{3R_5 V_{M_2}}{R_2} \tag{6}$$

Likewise, the voltage $V_3$ developed across resistor $R_6$ can be written as:

$$V_3 = \frac{R_6}{R_3}(V_{M_3} + V_{M_3'} + V_{M_3''}) \tag{7}$$

where $V_{M_3}$ is the voltage on monitor electrode $M_3$, $V_{M_3'}$ is the voltage on monitor electrode $M_3'$, and $V_{M_3''}$ is the voltage on monitor electrode $M_3''$.

When all of the pads are flush against the borehole wall, Equation 7 can we rewritten as:

$$V_3 = \frac{3R_6}{R_3}V_{M_3} \tag{8}$$

If now, the ratio of the output signals from phase-sensitive detectors 53 and 54 are taken, the ratio signal $V_R$ can be written as:

$$V_R = \frac{V_1 - V_2}{V_2 - V_3} \tag{9}$$

Combining Equations 4, 6, 8 and 9:

$$V_R = \frac{V_{M_1} - V_{M_2}}{V_{M_2} - V_{M_3}} \tag{10}$$

Thus, Equation 10 gives the ratio voltage $V_R$ in an errorless situation.

Now, for the case where one of the pad members is not flush against the wall of the borehole, the ratio voltage $V_R$ will be equal to:

$$V_R = \frac{\frac{R_4}{R_1}(3V_{M_1}-E_1) - \frac{R_5}{R_2}(3V_{M_2}-E_2)}{\frac{R_5}{R_2}(3V_{M_2}-E_2) - \frac{R_6}{R_3}(3V_{M_3}-E_3)} \quad (11)$$

where $E_1$ is the error voltage from $M_1$, $M_1'$, or $M_1''$, $E_2$ is the error voltage from $M_2$, $M_2'$, or $M_2''$, and $E_3$ is the error voltage from $M_3$, $M_3'$, or $M_3''$.

Rearranging Equation 11:

$$V_R = \frac{3V_{M_1} - E_1 - 3V_{M_2} + E_2}{3V_{M_2} - E_2 - 3V_{M_3} + E_3} \quad (12)$$

It can be seen from Equation 12 that the error voltage components $E_1$, $E_2$ and $E_3$ tend to cancel each other out. If one of the pad members separates from the wall of the borehole so that all of the electrodes of the separated pad are equal distance from the borehole wall, as shown in FIGURE 2, it is safe to assume that $E_1 = E_2 = E_3$. In this case Equation 12 can be written as:

$$V_R = \frac{V_{M_1} - V_{M_2}}{V_{M_2} - V_{M_3}} \quad (13)$$

It can be seen that Equation 13 is the same as Equation 10, which is the errorless situation. Thus, where one of the pad members becomes completely separated from the wall of the borehole, the ratio signal $V_R$ will be substantially errorless. The same procedure can be used to show that if two pad members becomes completely separated from the borehole wall, the ratio signal $V_R$ will still be accurate. Even if only part of one pad member should become removed from the wall of the borehole, any resulting error in the measurements will be substantially less with the apparatus of FIGURE 3 than by using one pad member only since the error voltage components tend to minimize each other. Even if one pad member is such as to produce a completely wrong measurement, the total error, using pads, is only ⅓ as great as with one pad.

It is to be understood that the principles set forth in this application are not limited to three pad members, but could readily be applied to two, four, five or more pad members.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for investigating earth formations traversed by a borehole comprising:
   (a) a central support member adapted for movement through the borehole;
   (b) a plurality of pad members supported by the central support member and adapted to engage the borehole wall;
   (c) a plurality of electrodes, at least some of which are located on the plurality of pad members;
   (d) means for supplying current to at least one of the electrodes for emission into the surrounding earth formations;
   (e) measuring means coupled to at least one electrode on each pad member for providing a measurement signal representative of a characteristic of the surrounding earth formations, said measuring means including:
      (1) a plurality of series impedance means each connected in series circuit relationship with one of the electrodes on each pad member, the impedance of each of said series impedance means being relatively large compared to the impedance of the earth formations;
      (2) second impedance means coupled between the non-electrode side of the plurality of series impedance means and a common reference point, the second impedance means having substantially less impedance than each of the series impedance means; and
      (3) means coupled to the second impedance means for providing the signal representative of the characteristic.

2. The apparatus of claim 1 wherein said plurality of electrodes includes a current-emitting electrode located on each pad member and the means for supplying current includes relatively high impedance means in series circuit relationship with each current-emitting electrode so that the current emitted by each of said current-emitting electrode will be substantially constant.

3. The apparatus of claim 1 wherein said plurality of electrodes further includes:
   (1) a plurality of first measure electrodes, one located on each pad member at a first distance from the current-emitting electrode on each pad member;
   (2) a plurality of second measure electrodes, one located on each pad member at a second distance from the current-emitting electrode on each pad member; and
   (3) a plurality of third measure electrodes, one located on each pad member at a third distance from the current-emitting electrode on each pad member, a separate one of the series impedance means connected to each one of the measure electrodes and separate ones of the second impedance means connected to the series impedance means which are connected to the first, second and third plurality of electrodes so that the measurements derived from said first, second and third plurality of electrodes will be average measurements.

4. The apparatus of claim 3 wherein said means connected across the second impedance means includes:
   (1) first means having a relatively high input impedance coupled between the second impedance means connected to the first plurality of measure electrodes and the second impedance means connected to the second plurality of electrodes for measuring the potential difference therebetween; and
   (2) second means having a relatively high input impedance coupled between the second impedance means connected to the second plurality of electrodes and the parallel second impedance means connected to the third plurality of electrodes for measuring the potential difference therebetween.

5. The apparatus of claim 1 wherein said plurality of electrodes further includes:
   (1) a plurality of first measure electrodes, one located on each pad member at a first distance from the current-emitting electrode on each pad member;
   (2) a plurality of second measure electrodes, one located on each pad member at a second distance from the current-emitting electrode on each pad member; and
   (3) at least one remote measure electrode located at a distance from the plurality of pad members, a separate one of the series impedance means connected to each one of the measure electrodes and separate ones of the second impedance means connected to the series impedance means which are connected to the first and second plurality of measure electrodes and said at least one remote measure electrode so that the measurements derived from said first and second plurality of measure electrodes and said at least one remote measure electrode will be average measurements.

6. The apparatus of claim 5 wherein said means connected across the parallel second impedance means includes:
   (1) first means having a relatively high input impedance coupled between the second impedance means connected to the first plurality of measure electrodes and the second impedance means connected to the second plurality of electrodes for measuring the potential difference therebetween; and (2) second means having a relatively high input impedance coupled between the second impedance means connected to the second plurality of electrodes and the second impedance means connected to the remote measure electrode for measuring the potential difference therebetween.

7. Apparatus for investigating earth formations traversed by a borehole, comprising:

(a) a plurality of exploring means adapted for movement through a borehole, each exploring means providing a plurality of measurement signals representative of given characteristics of the formations;

(b) a plurality of averaging means, each responsive to at least one measurement signal from each exploring means for providing an average measurement signal; and (c) means for combining the averaged measurement signals from at least two of the averaging means for providing an output signal representative of a given formation characteristic, the combining means acting to isolate the averaging means from one another so that the averaged measurement signals will be relatively unaffected by one another.

References Cited

UNITED STATES PATENTS

| 2,961,600 | 11/1960 | Tanguy | 324—10 XR |
| 3,047,794 | 7/1962 | Bennett et al. | 324—10 |
| 3,121,840 | 2/1964 | Lamb | 324—10 XR |
| 3,136,942 | 6/1964 | Schuster | 324—10 XR |

RUDOLPH V. ROLINEC, *Primary Examiner.*

G. R. STRECKER, *Assistant Examiner.*